Oct. 27, 1970 J. C. EWIN ET AL 3,536,842

ARRANGEMENT FOR SELECTING A ROUTE BASED ON THE HISTORY OF CALL COMPLETIONS OVER VARIOUS ROUTES

Filed Dec. 27, 1967 7 Sheets-Sheet 1

INVENTORS J. C. EWIN
L. J. GITTEN
BY Charles H Davis
ATTORNEY

Oct. 27, 1970 J. C. EWIN ET AL 3,536,842

ARRANGEMENT FOR SELECTING A ROUTE BASED ON THE HISTORY OF CALL COMPLETIONS OVER VARIOUS ROUTES

Filed Dec. 27, 1967 7 Sheets-Sheet 2

Oct. 27, 1970 J. C. EWIN ET AL 3,536,842

ARRANGEMENT FOR SELECTING A ROUTE BASED ON THE HISTORY OF CALL COMPLETIONS OVER VARIOUS ROUTES

Filed Dec. 27, 1967 7 Sheets-Sheet 4

ARRANGEMENT FOR SELECTING A ROUTE BASED ON THE HISTORY OF CALL COMPLETIONS OVER VARIOUS ROUTES

Oct. 27, 1970 J. C. EWIN ET AL 3,536,842

ARRANGEMENT FOR SELECTING A ROUTE BASED ON THE HISTORY OF CALL COMPLETIONS OVER VARIOUS ROUTES

Filed Dec. 27, 1967 7 Sheets-Sheet 7

United States Patent Office 3,536,842

Patented Oct. 27, 1970

3,536,842

ARRANGEMENT FOR SELECTING A ROUTE BASED ON THE HISTORY OF CALL COMPLETIONS OVER VARIOUS ROUTES

James C. Ewin, 8 High Point Road, Holmdel, N.J. 07733, and Lawrence J. Gitten, Ocean Township, Monmouth County, N.J. (402 Deal Road, Asbury Park, N.J. 07712)

Filed Dec. 27, 1967, Ser. No. 693,941
Int. Cl. H04q 3/56
U.S. Cl. 179—18 11 Claims

ABSTRACT OF THE DISCLOSURE

A telephone switching office is disclosed having apparatus for continuously monitoring and recording the history of success or failure in completing calls over different trunk routes to each of several terminating areas. As each call is completed over a trunk, the trunk is monitored for answer supervision to determine if the call was successful. An entry is then made in a trunk route history memory, indicating the destination of the call and whether or not the call was successfully completed. The trunk route history is consulted when making route selection for subsequent calls to permit the most favorable route to be selected.

BACKGROUND OF THE INVENTION

This invention relates to communications systems and particularly to apparatus for selecting trunk routes in a communications network.

In a more particular aspect, this invention relates to apparatus for recording the identity of trunk routes over which calls have been successfully completed so that the most favorable routes may be selected for subsequent calls.

Typically, a large communications network comprises a plurality of switching offices interconnected by trunk routes. Certain of the switching offices are designated "local" offices and they furnish service to the customers within a limited geographic area. Calls between customers in different areas are completed over trunk routes which directly couple the local offices or over trunk routes which are switched through one or more intermediate switching offices called "tandem" offices.

Due to the arrangement of the trunking network, calls from an originating office to a destination office can be completed over many different trunk routes and the trunk routes that switch via the tandem switching offices are often used to complete calls to a plurality of destination offices.

To utilize the trunking network most efficiently, each office attempts to select trunks in a direct route to the destination office. If no trunks are available in the direct route, attempts are made to find an idle trunk in one of the alternate routes, via tandem offices, to the destination office.

Thus, with the prior art trunk selecting schemes, trunk routes to each destination office are scanned in a predetermined sequence and all calls are forwarded over the first trunk route having available trunks. These prior art trunk selecting schemes have certain disadvantages which we have sought to overcome with the present invention. For example, a trunk route may be defective due to a failure of trunk or switching facilities at some point remote from the originating office. The trunks outgoing from the originating office in this route may, nevertheless, be idle and calls will be forwarded over this defective route only to be blocked before reaching their final destination.

To solve this problem, some schemes have been devised for transmitting traffic data to the switching offices in a network so that the offices might initiate remedial action when trouble is encountered in a route to avoid needlessly routing calls over a defective trunk route. These schemes, however, generally involve elaborate data links for transmitting information between the offices.

On the other hand, simple arrangements have been provided at a switching office whereby the common control equipment recycles or makes a second attempt to complete a call if the first attempt fails. The second attempt generally involves the use of different units of equipment and, in some cases, changes the order of trunk selection. While these latter so-called "second trial" features are wholly suitable for their intended purpose, they generally do not detect defects in a trunk route where the defect is remote from the originating office.

SUMMARY OF THE INVENTION

In accordance with one illustrative embodiment of our invention, a history record is kept of the success or failure of calls extended over a trunk route to each terminating office that is reached via that route. During route selection on subsequent calls, the history record is consulted so that a trunk route can be selected which has a favorable history of successful call completions to a particular terminating point. Arrangements also have been provided for updating the history record so that a trunk route having an unfavorable history of call completions will not go untested continuously.

BRIEF DESCRIPTION OF THE DRAWING

In order for the reader to gain a better appreciation of the arrangement contemplated, a brief description of the drawing will be given first, followed by a description of the operation of the system.

The drawing comprises FIGS. 1–9 in which:

FIG. 1 depicts a portion of a typical communications network comprising local switching offices designated 100–104 and tandem switching offices 105–108. Each local office furnishes telephone service to a plurality of customer stations designated S.

GENERAL DESCRIPTION

All of these switching offices are interconnected by a trunk network which enables customers at each local office to communicate with customers at any other office. Calls between adjacent local offices, such as 100 and 101, are established over direct trunk routes, such as trunk route 117. If no circuits are available in this direct route, the calls can be routed via tandem office 108 over alternate trunk routes 109 and 110.

Figure 1:
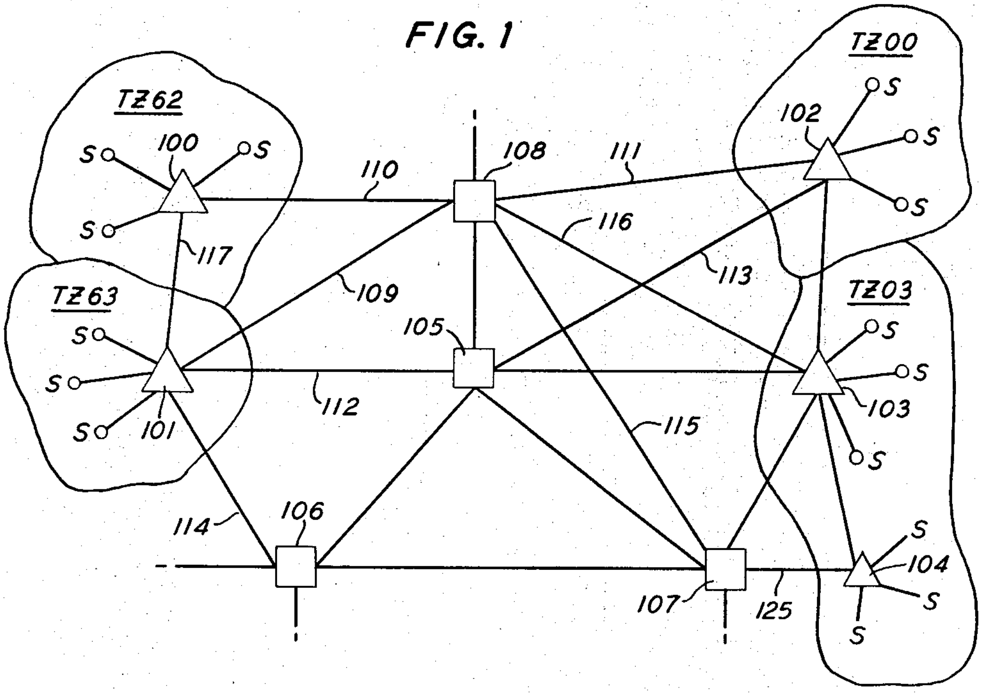
FIG. 1 shows a trunk route diagram of a typical communications network.

As can be seen in FIG. 1, many of the destination offices can be reached over the same trunk route outgoing from an originating office. For example, each of the local offices 102, 103, and 104 can be reached from local office 101 over trunk route 109. For those calls between local offices 101 and 102, trunk route 109 would be connected to trunk route 111 at tandem switching center 108. For calls between offices 101 and 103, trunk route 109 would be switched through tandem office 108 to trunk route 116, and for calls between offices 101 and 104, trunk routes 109 and 115 would be interconnected at tandem office 108 and trunk routes 115 and 125 would be interconnected at tandem office 107. The destination offices 102, 103, and 104 also can be reached from originating office 101 via alternate trunk routes 112 or 114 outgoing from local office 101.

Thus, in the network being described, calls between customers served by two remote offices are completed by serially interconnecting trunks in a plurality of different routes. Furthermore, each originating office generally has the ability to test only trunks in the routes outgoing from it to the next adjacent offices. In the example being described above, if a call is to be completed between local offices 101 and 102, local office 101 might select an idle trunk in route 109 to tandem office 108 but the call might block, nevertheless, due to a failure in trunk route 111 which is used from tandem office 108 to the destination office 102.

To improve the chances for call completion in a network in accordance with one feature of the invention, a history record is kept at each originating office for various trunk routes that can be used to a destination office. The trunk network is divided into a plurality of terminating zones. Each terminating zone may contain a single destination office or a group of destination offices which are associated for routing purposes. In FIG. 1, the terminating zones TZ00, TZ03, TZ62, and TZ63 have been shown. Each of these is shown containing one destination office, except terminating zone TZ03 which contains local offices 103 and 104.

When a call is originated at an office such as local office 101 and is destined for office 102, a trunk route such as 109 via tandem office 108 can be selected and the identity of the terminating zone (TZ00) of the destination office 102 is entered in memory associated with the trunk in the originating office. If trunk route 109 were utilized to complete a call to a different destination office such as local office 104, terminating zone TZ03 would be entered in the memory associated with the selected trunk in trunk route 109. Information is also entered into a memory to indicate whether or not the call was successfully completed to the destination office. Thus, a history record is maintained of the success or failure in completing calls to each terminating zone available over a particular trunk route.

On subsequent calls, the history record is consulted in making route selection. More specifically, trunk route for a particular destination office are selected in the normal predetermined sequence. However, if the first preferred trunk route has a bad history for completing calls to the terminating zone of the destination office, that route can be skipped and the control equipment will advance to the next best trunk route.

Once a trunk route has a bad history, it would be undesirable to skip that route continuously as the route might never be used even after being restored to service. Provisions are made, therefore, for attempting certain calls to a terminating zone over a particular route even though that route has a bad history record.

Figure 2:
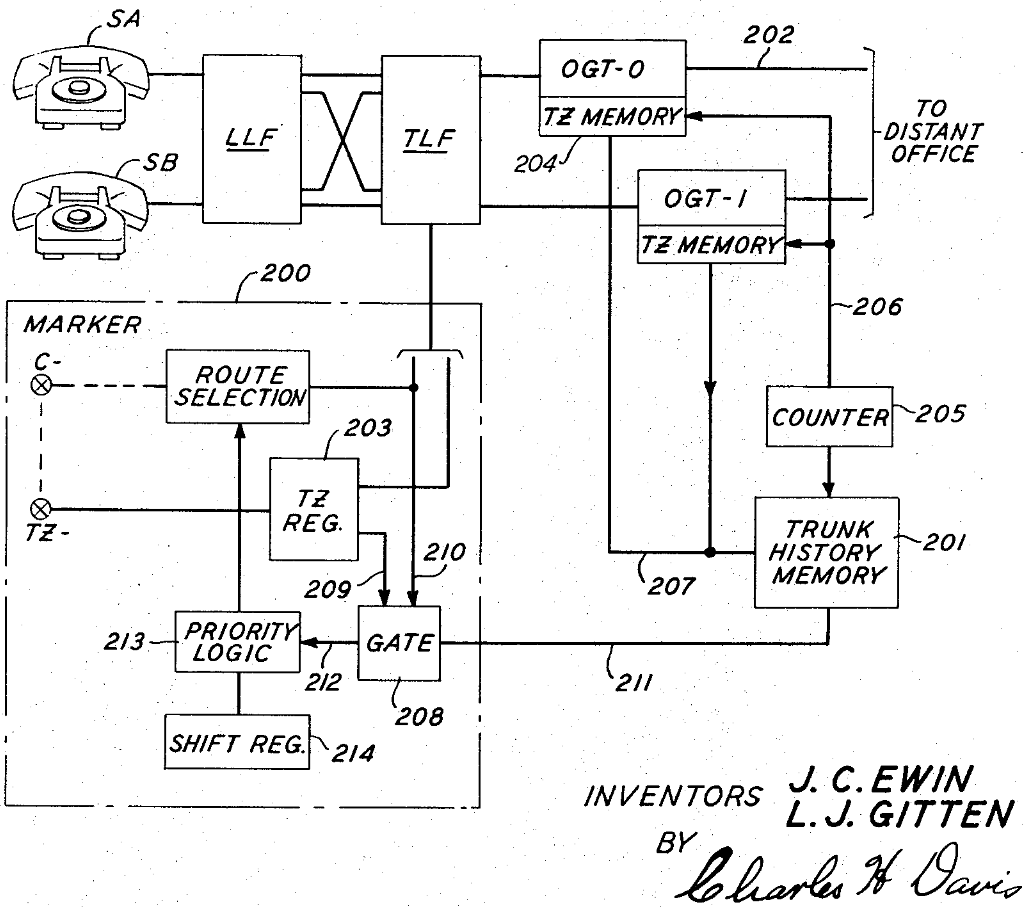
FIG. 2 shows in block diagram form the equipment at a switching center for making trunk route selection in accordance with the invention.

Turning now to FIG. 2, there is shown in block diagram form a typical local switching office. While our invention is suitable for use with many different types of switching offices, the switching office shown in FIG. 2 is similar to the crossbar-type system set forth in U.S. Pat. 2,585,904 to A. J. Busch of Feb. 19, 1952. As set forth in the Busch disclosure, the switching office comprises line link frames such as LLF on which customer lines SA and SB are terminated, trunk link frames such as TLF on which trunks OGT–0 and OGT–1 are terminated, and common control equipment such as marker 200 for controlling the connections between lines and trunks. Associated with the trunks and markers is a trunk history memory 201 for recording whether or not calls over a particular trunk route to a particular terminating zone are successfully completed.

To illustrate the operation of the arrangement, a typical call will be described wherein entries are made in the trunk history memory and a call will be described to illustrate how the information recorded in the memory is used during route selection.

When a customer such as SA initiates a call by lifting his receiver, a connection is established between the customer and an originating register circuit (not shown) which returns dial tone to the customer. The customer then dials the telephone number of the called station and this number is recorded in the originating register. The telephone number is generally made up of three or six digits identifying the destination office which serves the called customer plus the digits assigned to the called customer's station. When all digits have been recorded in the originating register, the register bids for an idle marker and passes the dialed telephone number and other information to the marker.

In the marker, the office code digits of the destination office are translated into information for selecting a trunk route to the destination office. More specifically, a potential is applied to a code point C-associated with the three-digit code of the destination office to operate a route relay in the marker. The route relay, in turn, operates trunk block and trunk group relays associated therewith to permit the marker to test individual trunks in order to determine if they are idle.

The route selected may serve many destination offices. Selectively wired to the code point in the marker, therefore, is a terminating zone register 203 which records the terminating zone number of the destination office for each call in progress. Assuming that trunk OGT–0 is in the trunk route being used for this call, then the terminating zone register forwards the terminating zone number through the trunk link frame to the terminating zone memory 204 associated with the trunk OGT–0. The telephone number of the called line is then outpulsed over the trunk conductors 202 by sender equipment not shown. When the call is answered at the destination office, answer supervision is returned back over trunk conductors 202 to trunk circuit OGT–0. The answer supervision is also recorded in terminating zone memory 204 indicating that the call was successfully completed. If the call is abandoned by the calling party before the called party answers, an indication is recorded in terminating zone memory 204 that the call failed to complete.

Periodically, counter 205 sends scanning pulses out over conductors 206 to read out information stored in the various terminating zone memory units associated with the trunk circuits. The information read out of the trunks is forwarded over conductors 207 to the trunk history memory 201.

The trunk history memory shown in FIG. 2 can be any one of many types of storage devices capable of storing information, usually in binary form. The memory is accessed using two addresses. One address corresponds to the trunk route and is generated by counter 205. The trunk route address defines a portion of the memory wherein the information can be stored for a particular trunk route. The portion of memory associated with each trunk route is further divided into smaller sections, each corresponding to a terminating zone served by that trunk route. Access to these sections for a particular trunk route is had by the terminating zone address which is received along with a "good" or "bad" indication when the information is read out of the terminating zone memory associated with each trunk.

Thus, counter 205 generates the address of each trunk route and causes each trunk in a route to be scanned. An answer back from the trunk causes an entry to be made in the proper terminating zone memory section of the trunk route being scanned and the entry indicates whether or not the call was successfully completed to that terminating zone.

On subsequent calls to a particular terminating zone via a trunk route, the trunk route history memory is consulted when making trunk selection to determine if the selected route has a favorable history of call completions. More specifically, a potential is applied to the code point C– to activate a route relay as before. This potential also sets the terminating zone register to partially enable gate circuitry 208. Gate circuitry 208 is selectively enabled by the terminating zone information received over conductors 209 from the terminating zone register and by the routing information received over conductors 210 from the route selection circuitry. When the gate circuitry is enabled, information pertaining to the history of calls to a particular terminating zone via the selected trunk route can be read out of the trunk history memory over conductors 211 and 212 to priority logic circuit 213.

Depending upon the priority classification of a particular call and the information received from the history memory, access to the selected trunk route is permitted or denied. Of course, high priority calls are denied access to routes having an unfavorable history while low priority calls may be permitted to attempt to complete over these routes to determine if the routes are still bad. If access to the selected route is denied, the marker route advances in a well-known manner in order to select a more favorable route.

Shift register 214 has been provided to override a bad history indication on a predetermined fraction of low priority calls so that a trunk route having a bad history will not go unused continuously.

DETAILED DESCRIPTION

Figures 7, 9:
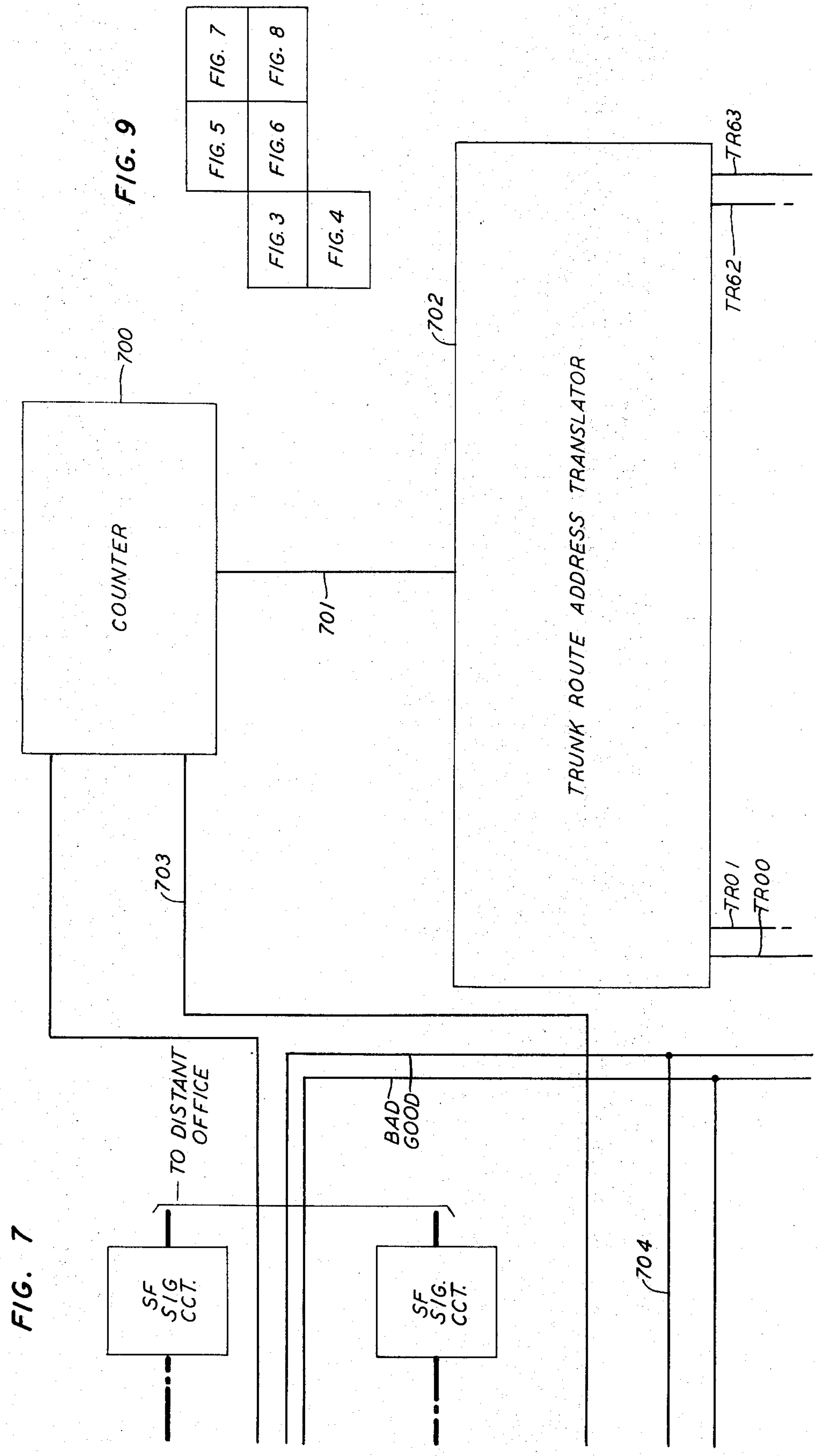

FIGS. 3–8, when arranged in accordance with FIG. 9, show in more detail a typical switching office similar to the switching office shown in the block diagram of FIG. 2. As mentioned above, the switching office set forth in the drawing is similar to that disclosed in U.S. Pat. 2,585,904 to A. J. Busch of Feb. 19, 1952 and is merely illustrative of the type of office that can be suitably provided with the invention.

In the aforementioned Busch patent, there is disclosed a switching system wherein marker circuits control the establishment of connections between lines and trunks of the system. Generally, on outgoing calls, a marker receives a calling line equipment location, the class of service of the calling line, and the called telephone number from an originating register circuit. This information is then used to interconnect the calling line with an outgoing trunk in one of the routes to the destination office.

Figure 3:
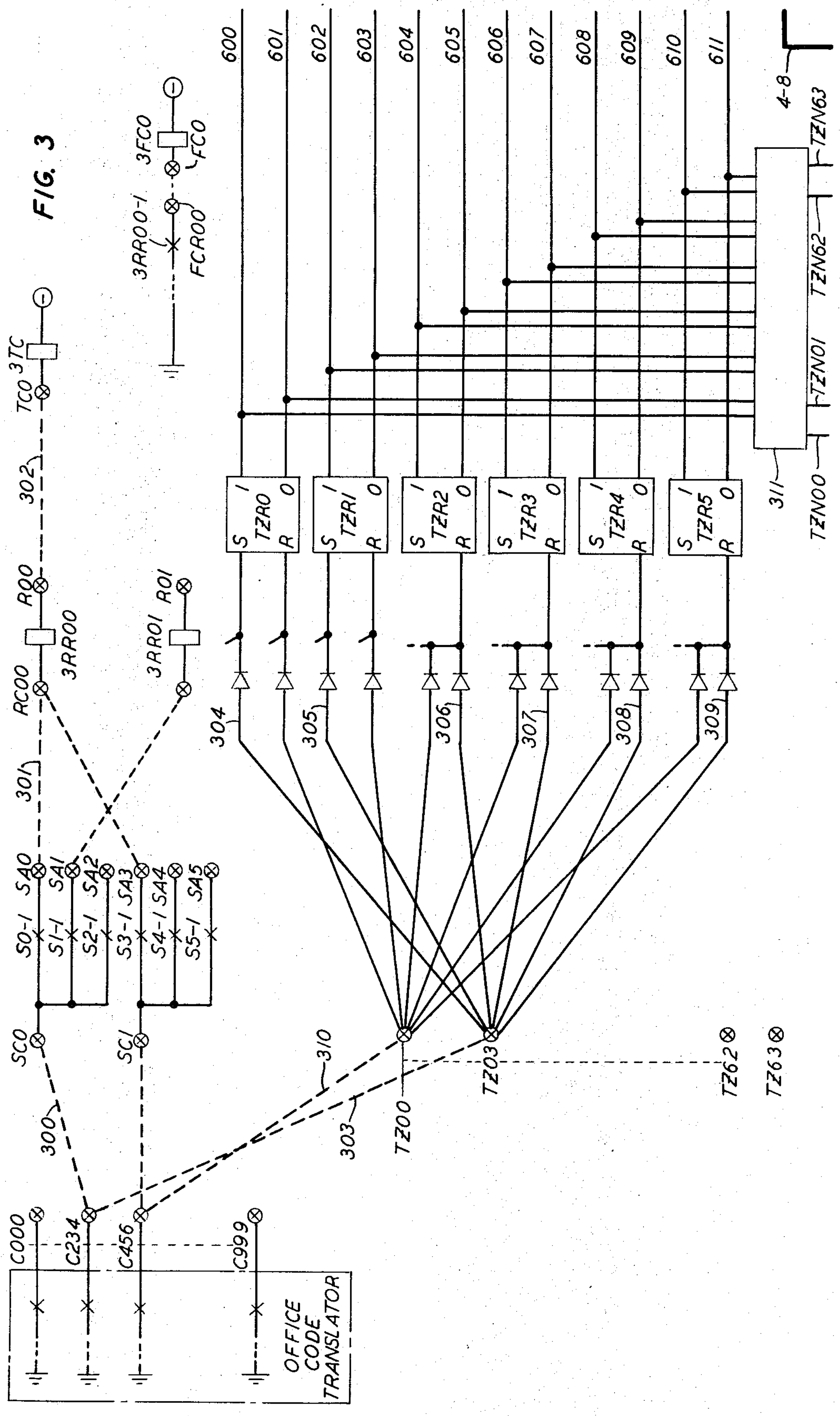
FIGS. 3–8, when arranged in accordance with FIG. 9, show in more detail the route selecting equipment at the switching office depicted in FIG. 2.
Figure 4:
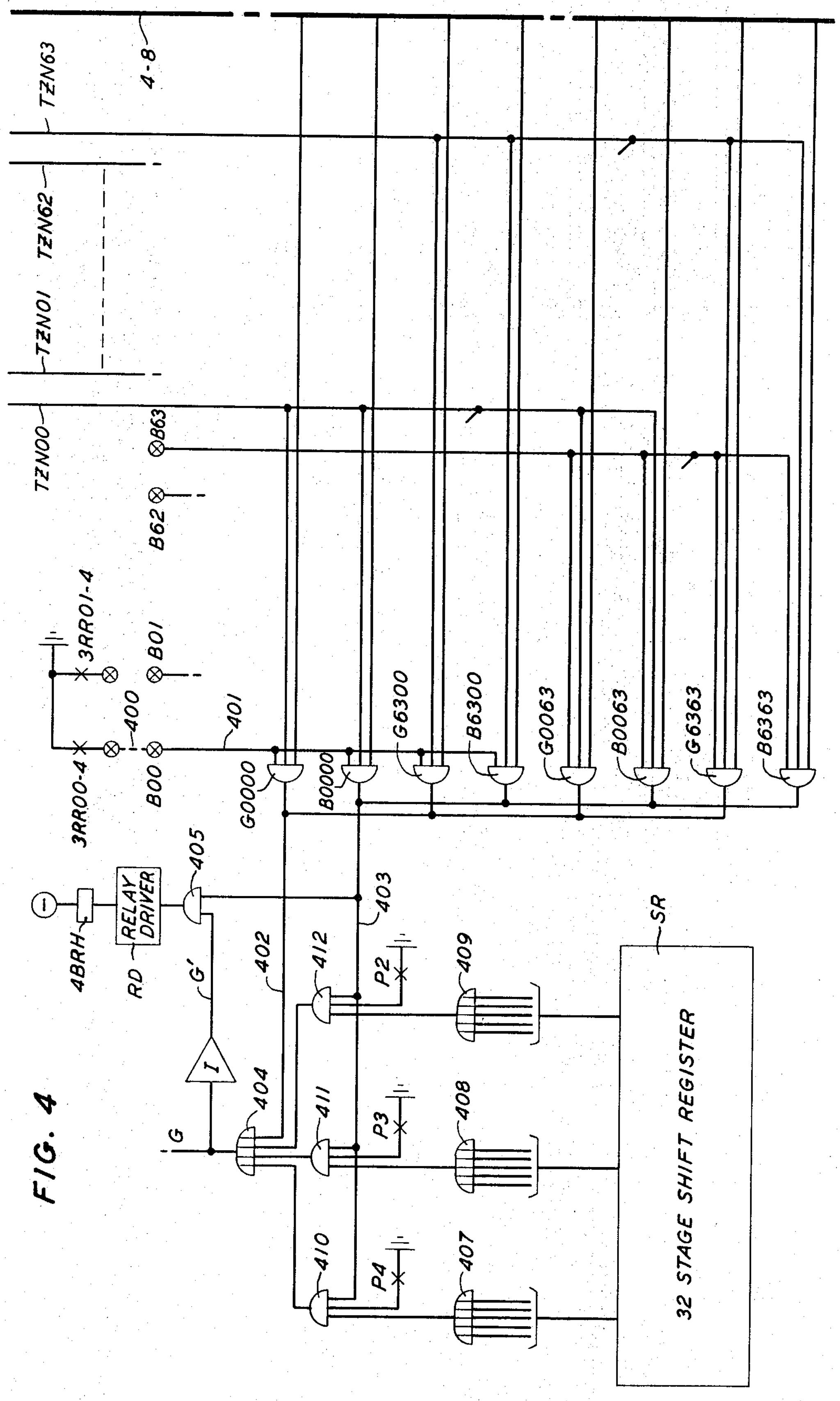
Figure 5:
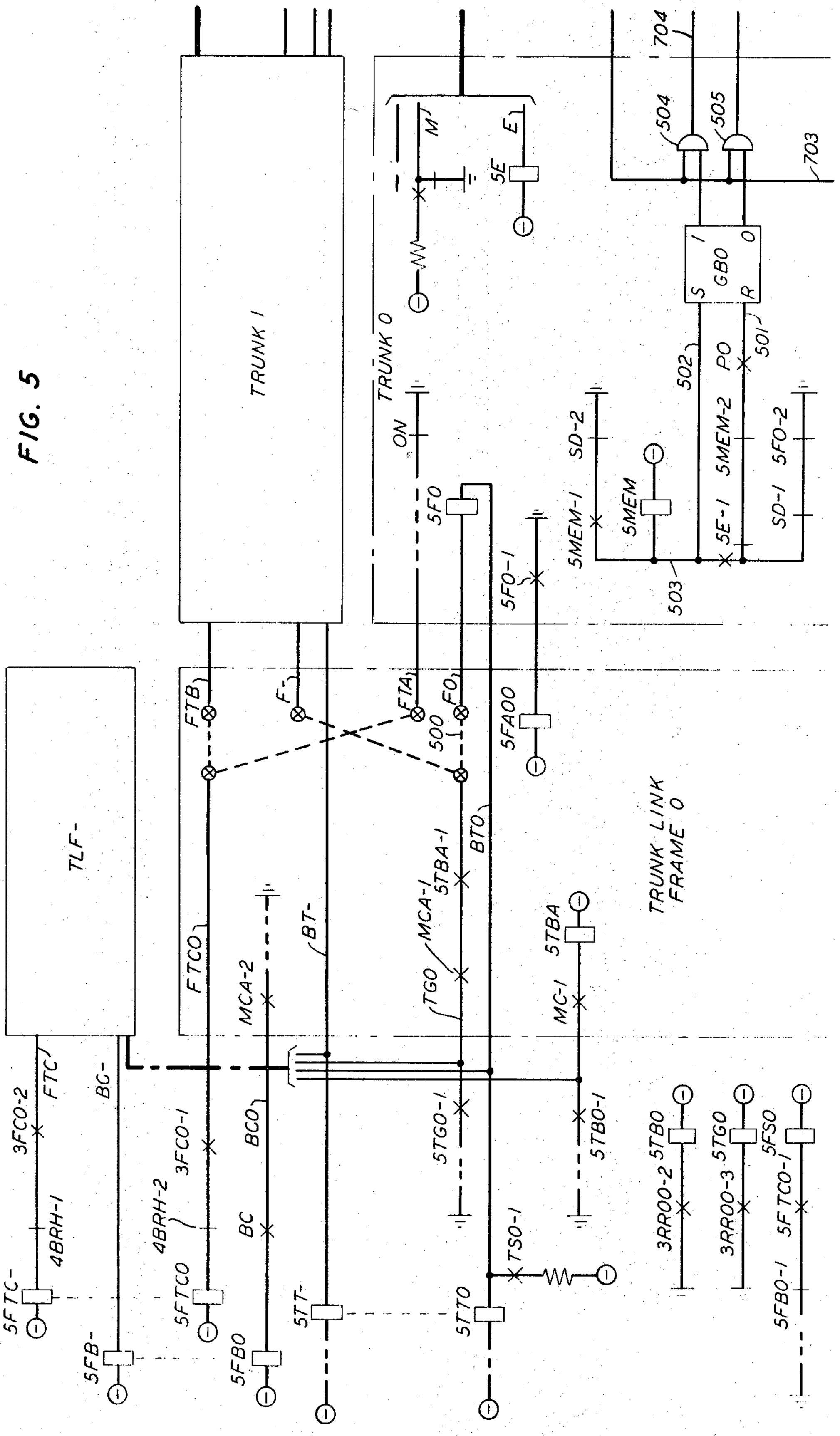
Figure 6:
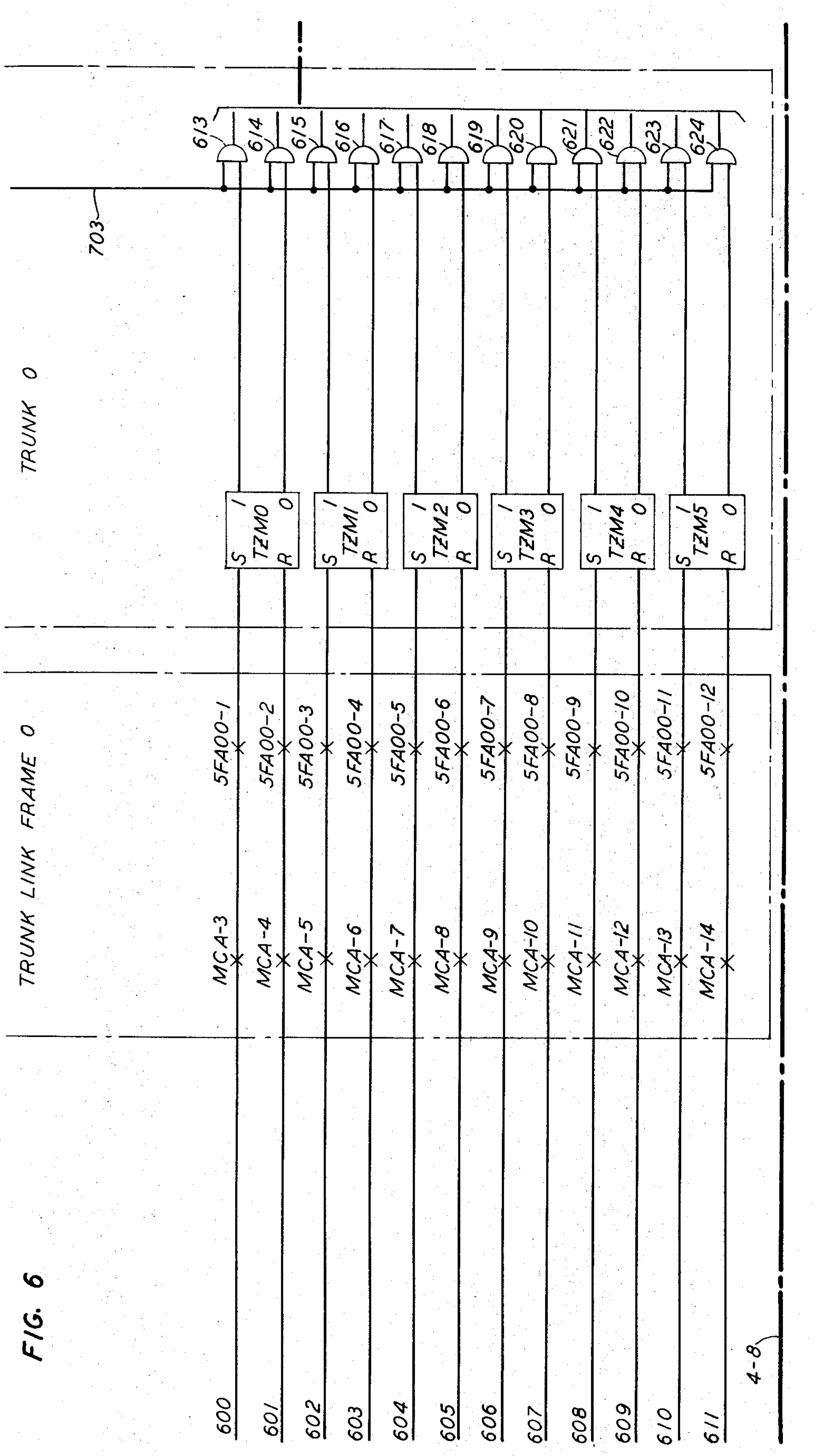
Figure 8:
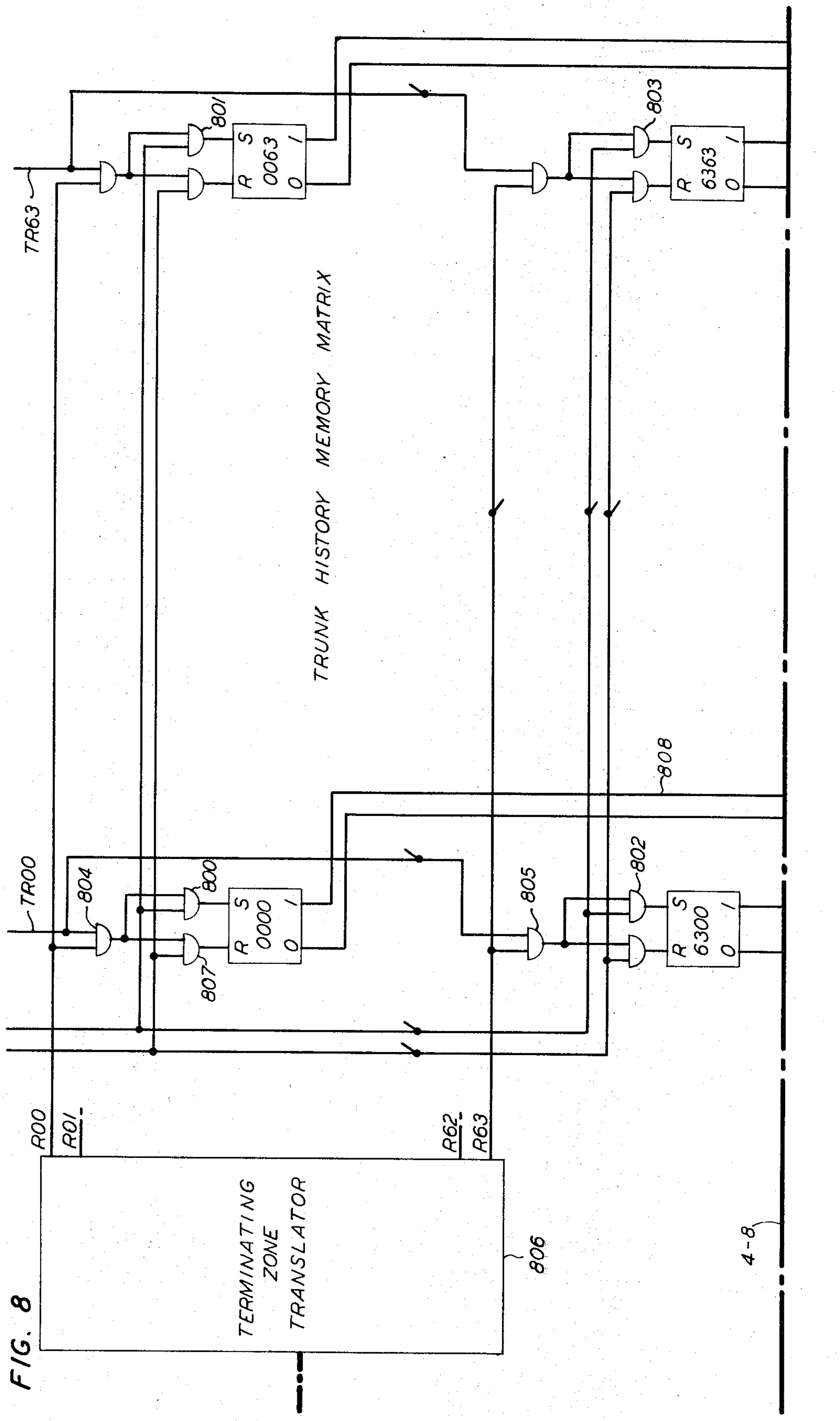

To simplify the disclosure, only a portion of the marker route selecting circuitry has been shown in FIG. 3. FIGS. 5 and 6 show a portion of the marker trunk selection circuitry, part of trunk link frame 0, and a simplified version of two trunk circuits, each equipped with a terminating zone memory. FIGS. 7 and 8 show the trunk history memory apparatus common to the markers and means for gating information from the individual terminating zone memory units associated with the trunks to the common memory. FIG. 4 shows the priority circuitry which responds to information from a trunk history memory to control route selection.

To illustrate how the arrangement functions, a description will be given now of a call to a destination office wherein an entry is made in the trunk history memory.

As set forth in the above-mentioned Busch disclosure, the marker receives the office code digits of the destination office and translates these digits into information for selecting the proper trunk route to the destination office. The office code generally comprises a three-digit number and, upon translation of the three-digit office code, a ground potential is applied to the appropriate code point in the marker. The code points are designated C000 through C999 and a few of the code points have been shown in FIG. 3 of the drawing. Assuming that the call is for a customer served by a local office whose office code is "234," then code point C234 would have a potential applied thereto.

The code points in a marker are cross-connected in many diffierent ways to operate route relays. In the illustrative example, code point C234 is cross-connected to punching SC0 and through contacts of class of service relays S0, S1, and S2. One of these class of service relays will be operated depending upon the class of serivce of the station originating the call. It can be seen from FIG. 3 that if class of service relay 50 is operated, route relay 3RR00 will operate in series with trunk class relay 3TC and if class of service relay S1 is operated, the potential on code point C234 will be extended to route relay 3RR01. Thus, with different interconnections between route relays and class of service relays, and depending upon the class of service of the calling station, different routing can be afforded to different customers.

It also will be noted that a potential on code point C456, which is associated with a different destination office, will operate the same route relay 3RR00 if the calling customer class of service relay C3 is operated.

With route relay 3RR00 operated in a circuit, including ground on code point C234, cross-connection 300, make contacts S0–1, cross-connection 301, the winding of route realy 3RR00, cross-connection 302, the winding of relay 3TC, and battery, the marker is prepared to test the trunks associated with route relay 3RR00. When route relay 3RR00 operates, it closes its contacts 3RR00–1 to complete a circuit for operating frame connector relay 3FC0. Frame connector relay 3FC0 closes its contacts to extend a plurality of FTC– leads from the trunk link frames to the windings of relays 5FTC– in the marker. All trunks in the same route on the same trunk link frame are cross-connected to the same FTC– lead and, when a trunk is idle, ground is extended from the trunk over the FTC– lead to the marker indicating that a particular trunk link frame has an idle trunk.

In addition, a relay BC, not shown, in the marker operates to extend busy test leads BC– from the trunk link frames to the marker to enable the marker to determine which trunk link frames are busy on other calls. With trunk link frame 0 idle and trunks 0 and 1 on trunk link frame 0 idle, relay 5FTC0 will be operated and relay 5FB0 will be released to provide an obvious operating circuit for frame selecting relay 5FS0. If the trunk link frame is busy or if all trunks in the selected group on that frame are busy, the marker will be directed to another trunk link frame.

Relay 5FS0 in operating causes the marker to go through a sequence of operations in order to seize the the trunk link frame, make the trunk link frame test busy to other markers, and operate connector relays, such as MC and MCA, to extend test and control leads from the marker to the trunk link frame in preparation for selecting an idle trunk.

The marker thereupon tests for an idle trunk in the proper route and selects a trunk for connection to the calling line. The trunks on each frame are divided into twenty-block groups containing a maximum of twenty trunks in each group. The twenty-block group and the location of the trunk within the group are determined by the route relay.

When the route relay 3RR00 operated, it also closed its contacts 3RR00–2 and 3RR00–3 in FIG. 5 to complete operating paths for twenty-block relay 5TB0 and test group relay 5TG0. Relay 5TB0 closes its contacts 5TB0–1 to complete an obvious operating path for relay 5TBA on trunk line frame 0.

When relays 5TBA on the trunk link frame and 5TG0 in the marker operate, a circuit is completed for extending ground over the frame conductors (F–) associated with each trunk in the selected group. If a trunk is idle, the ground will be returned to the marker over a busy test lead (BT–) to inform the marker which of the trunks in the group are idle. The circuit for testing the idle condition of trunk 0 can be traced from ground through marker equipment, not shown, through make contacts 5TG0–1, over conductor TG0, through contacts MCA–1 and 5TBA–1, over cross-connection 500, conductor F0, and through the winding of relay 5F0, back over conductor BT0 and through the winding of relay 5TT0, and marker equipment, not shown, to battery. Trunk test relay 5TT0 operates in this circuit but relay 5F0 in the trunk remains normal due to the high resistance winding of relay 5TT0. If other trunks in the selected route are idle, other 5TT– relays in the marker also will be operated at this time.

In the marker, however, there is a sequence circuit which advances with each market seizure. The sequence circuit causes the marker to prefer the selection of different circuits, such as trunks, with each marker usage. Let it be assumed that the sequence circuit is set so that trunk 0 will be preferred. Under these circumstances, relay TS0 will be operated to close its contacts TS0–1 extending a low resistance battery over conductor BT0 to operate trunk relay 5F0 in trunk 0.

Relay 5F0 operates making the trunk busy and also closing its contacts 5F0–1 to operate relay 5FA00 on the trunk line frame. Each trunk has a relay similar to relay 5FA00 which associates the trunk and its appearance on the crossbar switches of the trunk link frame with the marker circuit. The marker then proceeds to set up a channel connection between a calling line and a selected trunk, after which the marker relinquishes control of the connection to a sender for outpulsing the called number over the trunk conductors to the next switching center.

It will be recalled from the prior description that the switching network has been divided into a plurality of areas called terminating zones. Each terminating zone may represent a single destination office or a group of offices which are associated for routing purposes. For illustrative purposes, the network has been assumed to contain sixty-four zones and each marker is equipped to record, in binary form, one of sixty-four different zone numbers whenever a call is originated for a destination office in that terminating zone.

When a destination office code is translated and ground is applied to the code point to operate a route relay, the terminating zone for that destination office is also recorded in the marker. For example, when the office code "234" was dialed, ground was applied to code point C234 to operate route relay 3RR00 to direct the marker to the proper trunk group. This same ground is extended over cross-connection 303 to terminating zone punching TZ03 and over conductors 304–309 to terminating zone register flip-flops TZR0 through TZR5. Flip-flops TZR0 and T6R1 will be set and flip-flops TZR2 through TZR5 will be reset, thereby registering in binary form the terminating zone number 03 for the destination office. From the prior description, it also will be remembered that the grounding of code point C456 with class of service relay S3 operated also routes the call over the same trunk route, that is, the trunk route selected by a route relay 3RR00. In the case of office code C456, however, the destination office is in a different terminating zone and code point C456 is cross-connected via conductor 310 to terminating zone punching TZ00. Thus, depending on the office code of the destination office, different terminating zone numbers might be registered for the same trunk route.

The terminating zone number remains stored on the terminating zone register flip-flops in the marker until an idle trunk on a trunk link frame is seized. When the trunk is seized, its F– relay is operated which, in turn, operates a corresponding relay on the trunk link frame. In the example being described, trunk relay 5F0 in trunk 0 operated relay SF/A00 on trunk link frame 0. With the trunk link connector relay MCA operated and relay 5FA00 operated, the terminating zone number registered in the marker is forwarded over conductors 600–611 to the terminating zone memory in the trunk. Flip-flops TZM0 and TZM1 will be set and flip-flops TZM2 through TZM5 will be reset, thereby registering in the trunk the terminating zone number 03 of the destination office to which the call is being directed.

While the terminating zone number is being registered in a trunk, the marker is also establishing a channel connection between the calling line and the selected trunk In addition, the marker selects a sender and forwards the called telephone number to the sender, which outpulses the number over the trunk to the distant office.

When the marker is attached to the trunk, a relay SD in the trunk, not shown, operates and remains operated until the sender has completed outpulsing. With the sender attached to the trunk, the marker can relinquish control of the call to the sender and release. After making satisfactory channel continuity and double connection tests, the marker begins to release by releasing relay 5F0 in the trunk. Relay 5F0, in releasing, opens its contacts SF0–1 to release relay SFA00 on the trunk link frame, thereby interrupting the various test and control leads between the trunk and marker. Relay SF0 also closes its contacts SF0–2 in preparation for actuating flip-flop GB0 to indicate whether or not the call is successfully completed at the destination office.

For illustrative purposes, trunk 0 is assumed to be of the type arranged for E and M lead supervision and arranged to serve calls assigned to several precedence levels. E and M lead supervision is well known in the prior art and refers to arrangements for transmitting supervisory signals between two switching offices. Direct-current supervisory signals originating in one trunk circuit are applied over an M lead to a signal converter and converted to single frequency, multifrequency, et cetera signals for transmission over the trunk conductors to the second office. At the second office the signals are converted back to direct-current signals which are forwarded to the trunk circuit over an E lead. In other words, each trunk circuit transmits supervisory signals over its M lead and receives signals, such as called party answer supervision, over its E lead. Thus, the condition of the relay 5E, which is connected to the E lead, indicates whether or not the called party has answered, that is, whether or not the call has been successfully completed.

As mentioned above, trunk 0 is arranged to serve calls of different precedence levels. All trunk circuits with this feature will have the call precedence stored in it by the marker when the trunk is selected and the call is being set up. If calls having a higher priority level cannot find an idle trunk, a trunk may be commandeered from a lower priority call and used for the higher priority call.

It will be noted that flip-flop GB0 is reset indicating a bad route history only when the precedence level relay P0, not shown, is operated and this precedence level relay is operated for all calls in the three highest precedence levels. Flip-flop GB0, however, is set indicating a good history on calls of all precedence levels. It is felt that with this arrangement if a high priority call fails over a route, that route should be marked as a poor choice for a particular terminating zone. On the other hand, prior failures are quickly erased when a call of any precedence level is completed over the route.

Of course, it will be obvious to one skilled in the art that other arrangements are possible. For example, a separate trunk route history could be kept for each precedence level.

Returning now to the description of the call in progress, it will be remembered that relay 5F0 released when the marker relinquished control of the call to the sender. At the end of outpulsing, relay SD in the trunk releases and a path is extended from ground through break contacts 5F0–2, SD–1, 5E–1, and 5MEM–2, through make contacts P0, and over conductor 501 to reset flip-flop GB0. When the called party answers, a signal is received over the E lead in the trunk circuit to operate relay 5E which transfers the ground from conductor 501 to conductor 502 to set flip-flop GB0.

Each trunk is equipped with a flip-flop similar to flip-flop GB0. These flip-flops indicate whether or not the last call over their associated trunk was successfully completed. If the call is successfully completed, relay 5E in the trunk operates and flip-flop GB– is set. If the call is not completed, relay 5E does not operate and flip-flop GB– remains reset. Of course, other arrangements can be used to detect whether or not the call has been successfully completed without departing from the spirit and scope of our invention.

When ground is extended over conductor 502 to set flip-flop GB0 in FIG. 5, ground is also extended over conductor 503 to operate relay 5MEM. Relay 5MEM locks through its own contacts 5MEM–1 to ground at break contacts SD–2 and opens its contacts 5MEM–2 to prevent flip-flop GB0 from being reset when the called party disconnects releasing relay E in a trunk. Relay 5MEM releases when relay SD operates at the start of the next call.

Up to this point in the call, the marker has registered the terminating zone designation in the selected trunk and, upon receipt of answer supervision, flip-flop GB0 has been set indicating that this trunk has been successfully used to complete a call to a particular terminating zone.

Turning now to FIGS. 7 and 8, there is shown apparatus for recording the history of calls to various terminating zones over particular trunk routes. This apparatus comprises a clock-driven counter 700, which generates the address code for each trunk route, and enabling pulses for gating information stored in the GB– flip-flops of the trunk circuits. In addition, the apparatus comprises a flip-flop memory store and a translator for converting the binary code representing a terminating zone designation to a one-out-of-sixty-four indication for actuating the store.

The store can be any one of many familiar types of memory banks. For illustrative purposes, we have shown a matrix using bistable flip-flops for memory cells. The memory cells are arranged in sixty-four columns and sixty-four rows. Each column represents a trunk route and each row representing a terminating zone. By addressing the memory matrix with a trunk route address and a terminating zone address, a particular memory cell can be actuated to indicate whether calls to this terminating zone via a particular route have a good or bad history of completion.

Counter 700 is driven by clock pulses and generates in succession the matrix address of each of the trunk routes. The addresses, in binary form, are transmitted over conductors 701 to translator 702. Translator 702 translates each trunk route address into a one-out-of-sixty-four indication which appears as a signal on one of the output conductors TR00 through TR63. Each of these conductors is associated with one of the columns in which the information for a particular trunk route is stored. The two trunk circuits shown in FIG. 5 are assumed to be in the same route which is assigned the first column as its memory location in the trunk history memory. A signal, therefore, is transmitted over conductor TR00 to partially enable AND gates in each row similar to AND gates 804 and 805 in rows 00 and 63, respectively.

After the trunk route address is generated, a gating pulse is transmitted to each trunk circuit associated with that route. In the embodiment of the invention, trunks 0 and 1 are in the same route and the gating pulses would be sent in succession to each of these trunks and all the other trunks in that route. The gating pulse for trunk 0 appears on conductor 703 and partially enables AND gates 504 and 505 in FIG. 5 and partially enables AND gates 613 through 624 in FIG. 6.

One of the AND gates 504 and 505 will be enabled, depending on the condition of flip-flop GB0. That is, when flip-flop GB0 is set, indicating that trunk 0 was used on a successful call, AND gate 504 will be enabled, and when flip-flop GB0 is reset, indicating that the prior call failed, AND gate 505 will be enabled. Since it has been assumed that the prior call was successful, flip-flop GB0 will be set and AND gate 504 is enabled, thereby transmitting a signal over conductor 704 to the GOOD bus. A signal on the GOOD bus partially enables AND gates in each memory cell similar to AND gates 800 through 83 in preparation for setting a memory cell flip-flop.

It will be recalled that when the marker selected trunk 0, it stored a terminating zone number on the trunk terminating zone register flip-flops TZM0–TZM5 to indicate the terminating zone to which the call was being directed. For the example being described, flip-flops TZM0 and TZM1 were set and TZM2 through TZM5 were reset. The outputs of the terminating zone memory flip-flops TZM– and the gating pulse on conductor 703 fully enable AND gates 613, 615, 618, 620, 622, and 624 to transmit the terminating zone number from the terminating zone memory in the trunk to terminating zone translator 806 in FIG. 8. Translator 806 converts the binary number representing the terminating zone into a signal on one of the sixty-four R– leads corresponding to the sixty-four rows of memory cells. In this example, it has been assumed that the information for terminating zone 01 is to be entered on the first row of the trunk history memory matrix and a signal will be transmitted from translator 806 over conductor R00.

With the output signal from the terminating zone translator 806 on conductor R00 and a signal on conductor TR00 from the trunk route address translator, AND gate 804 is fully enabled. The output signal from AND gate 804 in combination with the signal on a GOOD bus enables AND gate 800 to set memory cell flip-flop 0000. Had there been a signal from the trunk on the BAD bus, AND gate 807 would have been enabled to reset memory cell flip-flop 0000.

Counter 700 continues gating into the trunk history memory information from each trunk in trunk route 00. This information indicates to which terminating zone the last call over that trunk was directed, and whether or not the call was successful. When all trunks in a route have been interrogated, the counter generates the address code of the next trunk route and the information stored in the trunks of this route is gated onto memory cells in the appropriate column of the trunk history memory matrix. Thus, a record is made and continuously updated for each trunk route indicating to what terminating zone the trunk was last used and whether or not the call was successfully completed.

While the information stored in the trunk history memory can be used for many purposes, such as in traffic studies, the history can be advantageously used to control trunk selection on subsequent calls to ensure that calls are not forwarded over routes having a bad history.

Assuming that an originating call is destined for the office whose code is "234," ground is once again applied to code point C234 and over the previously traced path for operating route relay 3RR00. In addition, the grounding of a code point causes the terminating zone number 03 to be registered in the terminating zone register flip-flops TZR-in the marker. As described above, the outputs of the terminating zone flip-flops are used to actuate, via the trunk link frame connector relays, corresponding flip-flops TZM- in the trunk that is selected. The outputs of the terminating zone register flip-flops TZR0 through TZR5 also are extended to translator 311.

Translator 311 converts the terminating zone number which is in binary code to a one-out-of-sixty-four indication on the TZN- conductors. In this example, a signal is transmitted over conductor TZN00 to partially enable AND gates G- and B- associated with all of the memory cells in a row of the trunk history memory matrix, and we shall assume that terminating zone 03 is assigned to the first row of the memory matrix. Only the AND gates G0000, B0000, G0063, and B0063 have been shown in FIG. 4 of the drawing.

When route relay 3RR00 operates from ground on code point C234, relay 3RR00 closes its contacts 3RR00–4 in FIG. 4 to extend ground over cross-connection 400 to punching B00 over conductor 401 to all AND gates G- and B-, in FIG. 4, which are associated with the memory cells in the first column of the trunk history memory matrix. Only the AND gates G0000, B0000, G6300 and B6300 associated with the first and last memory cell of column 0 have been shown in FIG. 4.

A signal is present on two of the inputs of each of the AND gates G0000 and B0000. One of these AND gates will be enabled by a signal on its third input, depending on the set or reset condition of the corresponding flip-flop 0000 in the trunk history memory. Since it has been assumed that flip-flop 0000 is set indicating a good trunk history, a signal is transmitted over conductor 808 in cable 4–8 to FIG. 4 and AND gate G0000 is enabled. When enabled, AND gate G0000 signals over conductor 402 to enable OR gate 404, which signals over conductor G informing the marker that this is a good route for calls to the desired terminating zone. The output of gate 404 is also inverted by inverter I and the inverter signal on conductor G′ prevents gate 405 from being enabled.

If the trunk history for trunk route 00 and terminating zone 01 had been bad, the memory cell flip-flop 0000 in FIG. 8 would have been reset and AND gate B0000 in FIG. 4 would have been enabled. With AND gate B0000 enabled on a call of the two highest priority levels P0 and P1, AND gate 405 is enabled to actuate relay driver RD, which operates blocking relay 4BRH. Referring now to FIG. 5, it can be seen that the contacts of relay 4BRH interrupt the FTC- leads between the trunk link frames and the marker, and it will be recalled that it is over these leads that the marker tests for an idle trunk. With the FTC- leads interrupted, all trunks in the selected route appear busy to the marker and the marker route advances to the next available trunk route. Thus, although trunks may be available in a route, the marker skips this route because of the bad prior history of calls completed over the route to a particular terminating zone.

Once a route has a bad history record, it would be unwise to continue skipping that route for all subsequent calls. Any trouble in a route which causes the prior calls to fail might no longer exist and subsequent calls might be successfully extended over that route. The marker is arranged, therefore, to permit a certain percentage of lower priority calls to use a route even though the route history is bad.

In FIG. 4, there is shown priority logic circuitry and a shift register SR. Shift register SR is a thirty-two-stage shift register which advances with each marker usage. The priority logic circuitry comprises OR gates 407, 408, and 409 and AND gates 410, 411, and 412. The inputs to OR gate 407 are connected to every other stage of the shift register so that OR gate 407 is enabled on alternate marker usages. OR gate 408 is connected to every fourth stage of shift register SR and is enabled with every fourth marker usage. OR gate 409, on the other hand, is connected to only one stage of the shift register SR.

On all calls wherein a bad history record is encountered, one of the AND gates B– in FIG. 4 will be enabled to signal over conductor 403 and partially enable AND gates 410, 411, and 412. On calls having the lowest priority level, relay P4 will be operated on every other marker usage, and OR gate 407 also will be enabled. With relay P4 operated, OR gate 407 enabled, and an enabling signal on conductor 403 indicating a bad history, AND gate 410 is enabled. AND gate 410 enables OR gate 404 whose output is inverted by inverter I to disable AND gate 405. Even though a bad history has been encountered, AND gate 405 is prevented from operating the blocking relay 4BRH and the marker is permitted to test the trunk route having a bad history. In other words, about one-half of the lowest priority calls are blocked from routes having a bad history while the remaining portion is permitted access to these routes in order to determine the current status of the route and update the trunk history memory matrix.

In a similar fashion, OR gate 408 is enabled on twenty-five percent of the calls allowing about twenty-five percent of the priority P3 calls access to a route having a bad history while the remaining portion of priority P3 calls are block from access to bad routes. Since OR gate 409 operates once in every thirty-two marker usages, priority calls of the P2 level will be permitted access to a route having a bad history approximately once in every thirty-two calls. As mentioned above, the highest priority calls P0 and P1 always skip those routes having an unfavorable history.

Of course it will be realized that by rearranging the interconnections between shift register SR and AND gates 410, 411, and 412, other percentages of calls can be allowed access to routes having an unfavorable history.

It is to be understood that the above-described arrangements are merely illustrative of the application of the principles of the invention. Numerous other arrangements may be devised by those skilled in the art without departing from the spirit and scope of the invention.

For example, instead of updating the trunk history memory by permitting service calls to have access to trunk routes having a bad history, test calls could be generated by automatic testing equipment which is available in the prior art.

In addition, instead of permitting the marker to route advance to the next available route, special routing programs could be established which would allow the marker to retest routes which priorly indicated a bad history.

We claim:

1. A switching network comprising a first office, a plurality of destination offices, a plurality of trunk routes from said first office to said destination offices, means at said first office for determining over which trunk routes prior calls to said destination offices have been blocked after being extended over said trunk routes, and means at said first office controlled by said determining means incident to the determination of trunk routes over which prior calls have been blocked for controlling the selection of said trunk routes for subsequent calls to said destination offices.

2. The invention defined in claim 1 wherein said determining means comprises a plurality of route memory stores, each associated with one of said trunk routes for registering the identity of a destination office when a route is selected, and means for detecting that a call has been blocked after being extended over said route.

3. The invention defined in claim 2 wherein said determining means also comprises a common memory store and means for transferring information registered in each said route memory store to said common store.

4. The invention defined in claim 3 wherein said route selection control means at said first office comprises means for interrogating said common memory store to determine the prior history of blocked calls over a particular route and means for denying access to certain routes over which prior calls have been blocked.

5. The invention defined in claim 4 wherein said route selection control means also comprises means for disabling said denying means on certain calls.

6. The invention defined in claim 2 wherein said detecting means comprises means responsive to a called party answer signal from said destination office.

7. In a multioffice communications network, a calling office, a plurality of trunk routes each extending from said calling office to destination offices, means for registering the identity of destination offices for prior calls directed over each said route and whether said calls were successfully established at the destination offices, and means at said calling office for selecting trunk routes for subsequent calls in accordance with the information in said register means.

8. In a communications system, an originating office, a plurality of destination offices, a plurality of trunk routes for extending calls of different precedence from said originating office to said destination offices, and an arrangement at said originating office for directing calls over a first preferred trunk route comprising register means for compiling a history record of successful and unsuccessful call completions over each route to each destination office and means controlled by said register means for selecting a trunk route for a particular destination office based on said history record.

9. The invention defined in claim 8 wherein said selecting means comprises means for blocking high-precedence calls from access to a trunk route over which prior calls were unsuccessfully completed and means for permitting low-precedence calls access to a trunk route over which prior calls were unsuccessfully completed to update said history record.

10. A telephone network comprising a plurality of numbered zones each having at least one destination office, a calling office, a plurality of trunk routes for extending connections from said calling office to customer stations at the destination offices in said zones, means at said calling office responsive to the selection of a route to a desired one of said destination offices for registering the zone number corresponding to said desired office and for detecting that a connection over a selected route has been established to one of said stations at said desired office, and means governed by said register means for selecting different ones of said routes for access to any office in the zone having said desired office.

11. In a call originating communication switching office having a plurality of trunk routes extending to remote destination offices, the combination comprising means at said originating office for registering the past history of call completions to destination offices over particular trunk routes and means responsive to said registering means for controlling the selection of trunk routes to destination offices for subsequent calls.

References Cited

UNITED STATES PATENTS 3,411,140 11/1968 Halina et al.

KATHLEEN H. CLAFFY, Primary Examiner

T. W. BROWN, Assistant Examiner